Feb. 5, 1963   W. A. HOFMANN   3,076,252
WIRE SCREEN SELVAGE AND METHOD OF MANUFACTURE
Filed Aug. 19, 1959
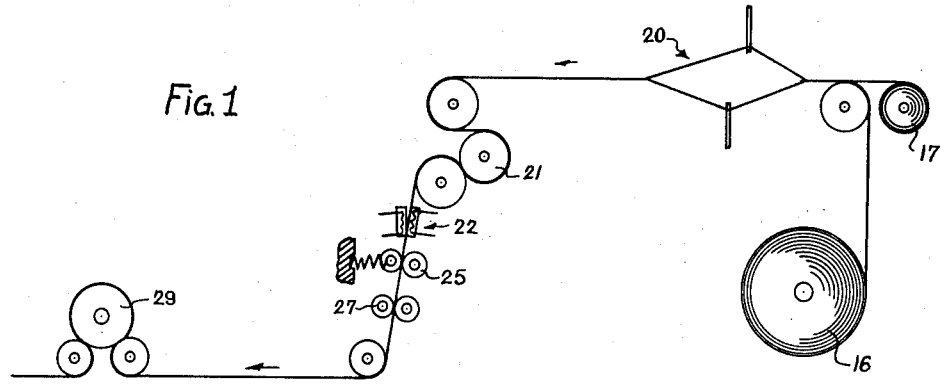
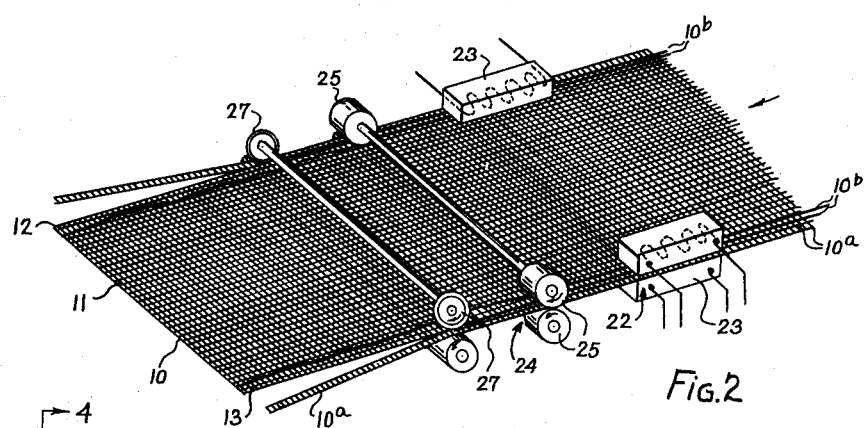
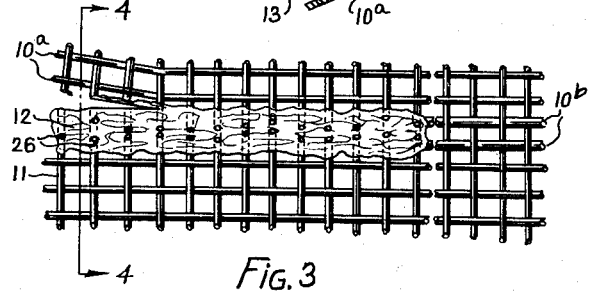
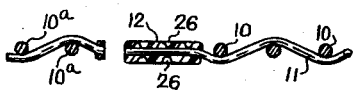
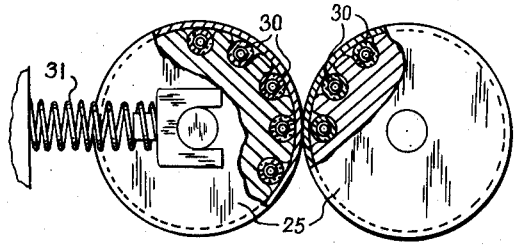
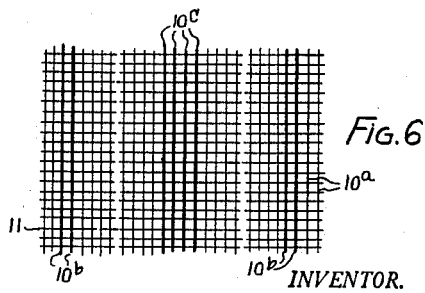
INVENTOR.
WALTER A. HOFMANN
BY Hudson, Boughton,
Williams, David & Hoffmann
ATTORNEYS

United States Patent Office 3,076,252
Patented Feb. 5, 1963

3,076,252
WIRE SCREEN SELVAGE AND METHOD OF MANUFACTURE
Walter A. Hofmann, Lyndhurst, Ohio, assignor to The Warner & Swasey Company, Cleveland, Ohio, a corporation of Ohio
Filed Aug. 19, 1959, Ser. No. 834,784
4 Claims. (Cl. 28—73)

The present invention relates to wire screening having a selvage edge and to a method of manufacturing such screening.

It is desirable that wire screening have a selvage edge such that a person handling the screen may grasp the edges thereof without cutting himself. Furthermore, it is desirable that selvage be less bulky than produced by tucking weft wires of the screens and by other known methods of providing a finished selvage edge.

An object of the present invention is to provide a new and improved wire screen having a finished selvage edge which is thin and flexible and of relatively inexpensive construction and which does not require the bending or tucking of the ends of the weft or fill wires.

A further object is to provide a new and improved, simple and efficient method of manufacturing wire screening with a finished selvage edge, which method may be readily and efficiently incorporated as part of a continuous operation for producing the screening.

A still further object of the present invention is to provide a new and improved method of making screening such that finished screening can be slit parallel to the warps to provide two sections of screening having finished selvage edges.

In accordance with the present invention, wire screening is woven with fusible warp strands and the warp strands are then fused to provide finished selvage edges. Preferably during the manufacturing operation there are one or more wire warp strands outwardly of the fusible strands until after the fusible warps have been fused and set, after which time the outboard wire warp or warps are removed, by slitting.

Further objects and advantages of the present invention will be apparent from the following detailed description made with reference to the accompanying drawing forming a part of this specification and in which:

FIG. 1 is a diagrammatic view of apparatus for producing the wire screening in accordance with and by the method of the present invention;

FIG. 2 is a diagrammatic view of a portion of FIG. 1;

FIG. 3 is an enlarged view of screening during the various stages of manufacture;

FIG. 4 is a sectional view of the finished selvage approximately along line 4—4 of FIG. 3;

FIG. 5 shows a modification of the apparatus of FIG. 1; and

FIG. 6 is a modification in the method where two screens having finished edges are produced simultaneously.

Completed screening embodying the present invention is shown in FIG. 2 exiting from the forming apparatus, indicated schematically by FIG. 2, and has warp wires 10, weft wires 11, and finished selvage edges 12 and 13 formed by a fusible material, a thermoplastic synthetic fiber, in the illustrated embodiment, originally woven into the screening as part of the warp and fused and set to bond it to the weft wires. The selvage edges present relatively smooth nonbulky edges to facilitate handling and, secondarily, prevent ravelling of the screen.

The finished selvage edge is formed, in the illustrated and preferred embodiment, by weaving fusible warp threads or strands into the screen at the edges 12 and 13 and then melting or fusing the threads to form a finished selvage edge. A plurality of fusible strands are preferably woven into the screening adjacent each edge. The fusible strands are preferably of a synthetic, thermoplastic fiber, such as nylon 6, which is nylon made from caprolactam with 10% monomer plasticizer. Other suitable fusible materials, such as polyethylene, polypropylene, polyester and vinyl may also be used. It is to be understood that other suitable fusible materials may be employed and that the fusible warp strands may be a filament or twisted.

FIG. 1 illustrates, schematically, apparatus for carrying out the method of the present invention. As indicated, the warp wires are supplied from a drum or loom beam 16 and thermoplastic warp strands are supplied from spools, such as spool 17, to a weaving machine where the warp is arranged as in the right-hand side of FIG. 2. As shown in FIG. 3, a pair of warp wires 10a provide the outermost warps along each edge, and immediately inwardly of the warp wires 10a are, in the illustrated embodiment, a pair of thermoplastic warp strands 10b. It will be understood that the number of fusible warp strands may be varied. The wires 10a may be termed "binding wires" since they function primarily to keep the strands 10b in place. The thermoplastic warp strands are preferably of a larger diameter than the warp wires.

The weft wires are woven between the warps at shed 20 and the woven screening with the thermoplastic warp strands 10b and binding wires 10a then pass over take-up rolls 21 to a heating station 22 for subjecting the fusible warp strands to heat, to render the latter plastic. The heating station 22 may comprise a pair of spaced heating elements 23 adjacent each selvage edge and between which the edges of the screening pass. The elements may be electrical or heated in any other suitable manner, such as by hot gases, or the strands may be heated by other means, such as radiation heaters including infra and dielectric heaters. At this station the fusible warps are preferably heated sufficiently to permit the fusing together of the adjacent thermoplastic warps into one plastic mass which bonds itself to the weft wires. The heating should be uniform and preferably is only that necessary to render the fusible material sufficiently plastic and flowable to fuse the strands and bond the material to the weft wires.

After the heating station 22, the screening passes to a rolling station 24 where each selvage edge passes between a pair of rollers 25 which applies pressure to the heated plastic strands to even or smooth out the plastic and to assure the fusing together of the adjacent thermoplastic strands and the bonding to the weft wires to provide a plastic finished selvage. The melted warp strands 10b flow into the spaces between the weft wires to fairly fill the spaces and to encase the weft wires, as in shown in FIG. 4. In practice, the thermoplastic material may not flow evenly over the weft wires and very small openings 26 may be left at the top and bottom of the weft wire. It will be noted, however, that there is substantial material on the weft wires to produce the necessary bond to hold the material in place. The opposite side of the finished selvage appears substantially the same as the side shown in FIGS. 2 and 3.

Attention is directed to the fact that a satisfactory bond is facilitated, in the illustrated embodiment, by the fact that at each selvage edge one warp strand 10b goes over and another under each of the weft wires. This assures that each of the weft wires will be encased after the fusing of the strands 10b.

Following the rolling station is a slitting station where a circular knife 27 adjacent each edge slits the screening adjacent the outboard side of the fused and set material to remove the outboard warp wires 10a and the outer ends of the weft wires so that the latter do not extend substantially beyond the finished selvage. This provides a straight, relatively nonragged selvage edge, as is shown in FIG. 2. It will be noted that in the finished screen the fused material is disposed outwardly of the warp wires and need not overlie the warp wires. If the material providing the finished selvage overlies the warp wires, the finished edge is bulkier than when the material does not overlie the warp wires.

From the slitting rolls 27, the screening moves to a wind-up roll 29.

While the heating and rolling stations have been shown as separate stations, they may be incorporated into a single station by heating the rolls for applying the pressure, as is shown in FIG. 5.

In FIG. 5, the pressure rolls 25, one of which is urged toward the other by a spring 31, have been modified to include heating elements 30 which extend axially of the rolls adjacent the undersides of the outer peripheries thereof. As stated above, if the pressure rolls of FIG. 5 are used, the separate heating station 22 is omitted.

The fusible material used preferably has a sufficiently high melting temperature so that the screening can be painted and dried at conventional drying temperatures, usually about 350° F., without adversely affecting the selvage edge. In the case of nylon, the melting point thereof is affected by the amount of plasticizer and the melting point can be varied by varying the percentage of plasticizer, as will be readily appreciated by those skilled in the art. Melting temperatures of 400°–450° F. are suitable for most commercial processes.

The present invention also facilitates the production of screening which is subsequently slit parallel to the warp to provide separate screens having finished selvage edges. To produce such a screening, the warp of the screen may be as shown in FIG. 6 where, in addition to the fusible warp strands 10b adjacent the edge, four fusible strands 10c constitute the central warp strands. These warps, as well as the fusible warps along the edges, are then fused, as described with reference to FIGS. 1–4, and slit along the center of the fused material of the strands 10c, as well as along the edges, to divide the screening into two sections, each having finished selvage edges. It is to be understood that the number of warps 10c can be varied.

The apparatus for weaving the wire screening has not been shown in detail since it is conventional and well known to those skilled in the art.

While the preferred embodiment has been described in considerable detail, other modifications, constructions, and arrangements are contemplated and it is hereby my intention to cover all such constructions, modifications, and arrangements that fall within the ability of those skilled in the art and the scope and spirit of the present invention.

Having thus described my invention, what I claim is:

1. The method of manufacturing wire cloth which comprises weaving the cloth with substantially parallel weft wires of predetermined length woven transversely through the longitudinally extending warp wires and having substantially straight cut off opposite ends; simultaneously with the weaving of the cloth weaving therein adjacent to the longitudinal margins of the cloth warp-like strands of larger cross-sectional area than the warp and weft wires and of a material which fuses at a lower temperature than said wires; then applying heat and pressure to said warp-like strands to fuse the strands into formable masses and press said masses into substantially strip-like forms having appreciable width and extending longitudinally of the cloth and embedding therein portions of the weft wires extending transversely of the strip-like forms; causing solidification of said strip-like forms; and then severing from the solidified strip-like forms the longitudinal outer edge portions thereof and from the portions of the weft wires embedded in said forms the parts of said portions that are embedded in the longitudinal outer edge portions of the strip-like forms to provide the cloth with smooth selvages from which no weft wires project at the margins of the cloth.

2. The method defined in claim 1 wherein the weaving into the cloth adjacent the longitudinal margins thereof of the warp-like strands includes the weaving therein of thermoplastic synthetic fiber warp-like strands.

3. The method of manufacturing wire cloth as defined in claim 1 and which includes simultaneously with the weaving of the cloth weaving therein approximately at the longitudinal center line of the cloth warp-like strands of larger cross-sectional area than the weft and warp wires and of a material which fuses at a lower temperature than said wires; then simultaneously with the application of heat and pressure to the warp-like strands adjacent the longitudinal margins of the cloth applying heat and pressure to the warp-like strands that are approximately at the longitudinal center line of the cloth to fuse the latter strands into a formable mass and press said latter mass into substantially strip-like form of appreciable width extending longitudinally of the cloth and embedding therein portions of the weft wires; and then after solidification of all the strip-like forms severing, in addition to the strip-like forms adjacent the margins of the cloth, the strip-like form approximately at the longitudinal center line of the cloth to convert the woven cloth into narrower separate lengths of cloth each having on its longitudinal margins smooth selvages in which the weft wires are embedded without projecting marginally therefrom.

4. The method of manufacturing wire cloth as defined in claim 1 wherein the warp-like strands simultaneously woven into the cloth adjacent to the longitudinal margins thereof are located inwardly of warp wires woven into the cloth at the longitudinal margins thereof and which last named warp wires are severed from the cloth by the operation of severing the longitudinal outer edge portions of the strip-like forms.

References Cited in the file of this patent

UNITED STATES PATENTS

| 1,709,887 | Sponholz | Apr. 23, 1929 |
| 1,854,693 | Dickie et al. | Apr. 19, 1932 |
| 2,659,958 | Johnson | Nov. 24, 1953 |
| 2,677,872 | Teague | May 11, 1954 |
| 2,769,222 | Southwell | Nov. 6, 1956 |
| 2,771,659 | Ball | Nov. 27, 1956 |
| 2,840,117 | Scruggs | June 24, 1958 |

FOREIGN PATENTS

| 199,574 | Austria | Sept. 10, 1958 |